United States Patent [19]
Park

[11] Patent Number: 5,926,452
[45] Date of Patent: Jul. 20, 1999

[54] DISC CLAMPING APPARATUS FOR A DISC PLAYER

[75] Inventor: Beoung-Chel Park, Seoul, Rep. of Korea

[73] Assignee: Daewoo Electronics Ltd., Seoul, Rep. of Korea

[21] Appl. No.: 08/941,077

[22] Filed: Sep. 30, 1997

[30] Foreign Application Priority Data

Sep. 30, 1996 [KR] Rep. of Korea ........................ 96-42954

[51] Int. Cl.$^6$ ........................ G11B 25/00; G11B 17/04
[52] U.S. Cl. ........................ 369/270; 360/99.06
[58] Field of Search ........................ 360/98.04, 99.02, 360/99.06, 99.12, 137; 369/13, 75.2, 77.1, 77.2, 97, 191, 270, 292

[56] References Cited

U.S. PATENT DOCUMENTS

| | | | |
|---|---|---|---|
| 4,653,039 | 3/1987 | Ueno et al. | 369/75.2 |
| 4,669,076 | 5/1987 | Broom et al. | 369/77.1 |
| 5,058,094 | 10/1991 | Suzuki | 369/77.1 |
| 5,067,121 | 11/1991 | Einhaus | 369/75.2 |
| 5,084,855 | 1/1992 | Kobayashi et al. | 369/75.2 |
| 5,636,198 | 6/1997 | Maeng | 369/191 |

*Primary Examiner*—Stuart S. Levy
*Assistant Examiner*—Angel Castro
*Attorney, Agent, or Firm*—Pillsbury Madison & Sutro LLP

[57] ABSTRACT

A disc clamping apparatus for a compact disc player. The apparatus has a clamp for clamping a disc loaded on a turntable, an elastic wire for upwardly lifting the clamp and for horizontally maintaining the clamp above the turntable, a pair of extension bars connected to a spring to downwardly bias the elastic wire, and a serpentine bar which makes contact with an upper surface of the clamp to allow the clamp to stably rotate. The apparatus does not make contact with the disc while the disc is being inserted/ejected into/from the disc player, so damage to the disc or to the clamp can be prevented. Since the clamp is horizontally maintained above the turntable by the elastic wire, the clamp does not fluctuate while a user is driving the vehicle, so the clamp is prevented from colliding with a cover plate, thereby reducing the noise.

10 Claims, 5 Drawing Sheets

DISC CLAMPING APPARATUS FOR A DISC PLAYER

BACKGROUND OF THE INVENTION

1. Field of the Invention

The present invention relates to a disc clamping apparatus for a disc player, and more particularly to a disc clamping apparatus of a compact disc player used in a vehicle.

2. Description of the Prior Art

In general, an optical disc player records and reproduces information on and from an optical disc using an optical pick-up which is installed under an optical disc. In the optical disc player, the optical disc is positioned on a turntable which is rotated by a spindle motor and is clamped by a clamping apparatus so as to be stably rotated even when external impacts are exerted thereto.

Recently, such an optical disc player has been used in a vehicle as well as for domestic use. In a vehicular optical disc player, while a vehicle to which the optical disc player is mounted is travelling on a road, vibrational forces can be exerted to the disc player, so a clamping apparatus is needed to stably clamp the optical disc.

FIGS. 1 and 2 show a conventional disc player 200 for a vehicle. FIG. 1 is a plan view of disc player 200, and FIG. 2 is a side sectional view of disc player 200 shown in FIG. 1.

As shown in FIGS. 1 and 2, the conventional vehicular disc player 200 includes a base 210. A disc insertion hole 212 through which a disc (not shown) is inserted and ejected is provided on one side of base 210. To the upper surface of the base is fixedly attached a first cover plate 220 which covers about half the upper surface of base 210 on the front side of base 210 which is adjacent to the disc insertion hole 212. A second cover plate 230 is hinged to the upper surface of base 210 on the rear side of base 210.

The second cover plate 230 is downwardly urged by a spring provided on the rear side of base 210.

A hinge shaft 234 is provided to the rear of a first side of second cover plate 230, and second cover plate 230 is hinged to base 210 by hinge shaft 234. A guide shaft 232 is provided to the front of a second side of a second cover plate 230, which is opposite to the first side thereof. Guide shaft 232 is supported on a movable plate 240 provided on one side of base 210. Movable plate 240 is moved by a separate gear mechanism (not shown) to the front or rear side of base 210. Guide shaft 232 is selectively supported on upper or lower portion 242 or 244 of movable plate 240 when movable plate 240 is moved, and the front portion of second plate 230 is thus upwardly or downwardly movable.

A clamp suspension 250 is integrally formed in a front end portion of second cover plate 230. Clamp suspension 250 is protruded by a distance from the front end portion of second cover plate 230 toward the center of base 210. A slot 254 for attaching a clamp 300 to clamp suspension 250 is formed in clamp suspension 250, and a serpentine portion 252 which extends along the center of slot 254 in a longitudinal direction of slot 254 is integrally provided in clamp suspension 250 above slot 254. The free end of serpentine portion 252 makes contact with clamp 300 so that clamp 300 stably clamps the disc.

As particularly shown in FIG. 2, clamp 300 includes an annular plate 260 which makes contact with the upper surface of the disc, a neck portion 262 which is provided on annular plate 260 and press-fitted into slot 254 of clamp suspension 250, and a support portion 264 which is provided on neck portion 262 and positioned on the upper surface of clamp suspension 250, and a boss 266 which is protruded at the center portion of the upper surface of support portion 264 so as to make contact with the free end of serpentine portion 252.

At the central portion of the lower surface of base 210 is provided a spindle motor 270 for rotating turntable 280.

Hereinafter, the operation of the conventional vehicular disc player 200 will be explained.

Firstly, when disc player 200 is not in operation, that is, the disc hs been ejected from disc player 200, guide shaft 232 is supported on upper end portion 242 of movable plate 240, and the front portion of second cover plate 230, as shown in FIG. 2, remains upwardly moved.

In this state, when the disc is inserted into disc insertion hole 212, the disc is guided into the interior of disc player 200 and positioned on turntable 280 by a disc loading mechanism (not shown) such as a gear mechanism or the like. Then, movable plate 240 is moved to the front of base 210 by a separate gear mechanism. As movable plate 240 is moved to the front of base 210, guide shaft 232 supported on upper end portion 242 of movable plate 240 is supported on lower end portion 244 of movable plate 240, and the front portion of second cover plate 230 is moved downward.

As a result, annular plate 260 of clamp 300 makes contact with the upper surface of the disc positioned on turntable 280, and a bending portion 252 which is integrally formed in clamp suspension 250 by a spring installed on the front side of base 210 downwardly urges boss 266 provided on the upper surface of clamp 300 to stably clamp the upper surface of the disc.

However, in the conventional vehicular disc player 200, when disc player 200 is not in operation, clamp 300 collides with the lower surface of first cover plate 220 during the running of the vehicle, causing rattle noise.

In addition, a hook portion having elasticity should be formed on neck portion 262 of clamp 300 in order to assemble clamp 300 in slot 254 of clamp suspension 250, so the manufacturing process of clamp 300 is complicated.

Moreover, when disc player 200 is not in operation, the clamp 300 remains upwardly tilted toward disc insertion hole 210, so the disc makes contact with clamp 300 during insertion of the disc, and as a result, the disc cannot be positioned on turntable 280.

SUMMARY OF THE INVENTION

The present invention has been made to solve the problem of the prior art, and accordingly, it is an object of the present invention to provide a clamping apparatus for a disc player which does not make contact with a disc being loaded onto a turntable, which can be easily manufactured, and which can reduce noise caused by a collision between a cover plate and a clamp.

To accomplish the above object of the present invention, there is provided a disc clamping apparatus for a disc player having a base, a first cover plate attached to an upper front portion of the base, a second cover plate hinged to an upper rear portion of the base, and a turntable disposed at a center of the base, the disc clamping apparatus comprising:

a clamp for clamping the disc loaded on the turntable;

a first means for upwardly lifting the clamp by a first biasing force, the first means horizontally maintaining the clamp in a position corresponding to a position of the turntable;

a second means for downwardly forcing the first means by a second biasing force so that the clamp is rested on an upper surface of the turntable;

a third means for allowing the clamp to stably rotate, the third making contact with a center portion of an upper surface of the clamp; and a fourth means for securing the first means to an upper surface of the first cover plate.

According to a preferred embodiment of the present invention, the first means includes a multi-stepped elastic wire having a supporting section fixedly supported on the upper surface of the first cover plate, a clamp suspending section integrally formed with an upper end of the supporting section, and a tilting section integrally formed with a lower end of the supporting section. The clamp suspending section horizontally extends to the turntable by a predetermined length for suspending the clamp above the turntable. The tilting section is downwardly inclined with respect to the support section by a predetermined angle.

The fourth means includes a plurality of fixing jaws formed on the upper surface of the first cover plate. The supporting section of the elastic wire is securely coupled to the fixing jaws.

The clamp includes an annular plate which makes contact with an upper surface of the disc, a neck portion integrally formed with a center of an upper surface of the annular plate, a cap portion integrally formed on an upper surface of the neck portion and having a diameter larger than a diameter of the neck portion, and a protuberance integrally formed at a center of an upper surface of the cap portion. The clamp suspending section has an annular concave portion into which the neck portion of the clamp is inserted.

The second means includes a pair of springs which are provided at both sides of the second cover plate for downwardly biasing the second cover plate, and a pair of extension bars which are integrally formed with a front portion of the second cover plate. The extension bars extend toward the first cover plate so as to make contact with an upper portion of the clamp suspending section.

The third means includes a serpentine bar provided between the pair of extension bars. The serpentine bar extends toward the first cover plate so as to make contact with an upper portion of the protuberance.

When the disc is inserted into a disc insertion hole by a user, the disc is guided into the interior of the disc player and positioned on the turntable by a disc loading mechanism such as a gear mechanism. At this time, since the clamp is horizontally maintained above the turntable, the disc being loaded onto the turntable does not collide with the clamp.

Then, the front portion of the second cover plate is moved downward by means of biasing force of the spring. At this time, the clamp suspending section of the elastic wire is downwardly forced by the pair of extension bars which are integrally formed with the front portion of the second cover plate so as to make contact with the upper portion of the elastic wire. At this time, the clamp engaged with the clamp suspending section is moved downwardly while maintaining its horizontal state. As a result, the annular plate of the clamp makes contact with the upper surface of the disc loaded on the turntable.

On the other hand, the serpentine bar slightly makes contact with the upper surface of the protuberance when the disc has been loaded on the turntable so that the annular plate of the clamp can stably make contact with the disc loaded on the turntable.

As described above, the clamping apparatus according to the present invention does not make contact with the disc while the disc is being inserted/ejected into/from the disc player, so damage to the disc or to the clamp can be prevented.

In addition, since the clamp is horizontally maintained above the turntable by the elastic wire, the clamp does not fluctuate while a user is driving the vehicle, so the clamp is prevented from colliding with the first cover plate, thereby reducing the noise. Furthermore, since the clamp is easily assembled to the elastic wire, manufacturing the clamp is easy.

BRIEF DESCRIPTION OF THE DRAWINGS

The above object and advantages of the present invention will become more apparent by describing in detail a preferred embodiment thereof with reference to the attached drawings, in which.

DETAILED DESCRIPTION OF THE INVENTION

Hereinafter, the preferred embodiment of the present invention will be explained in detail with reference to the accompanying drawings.

Figure 1:
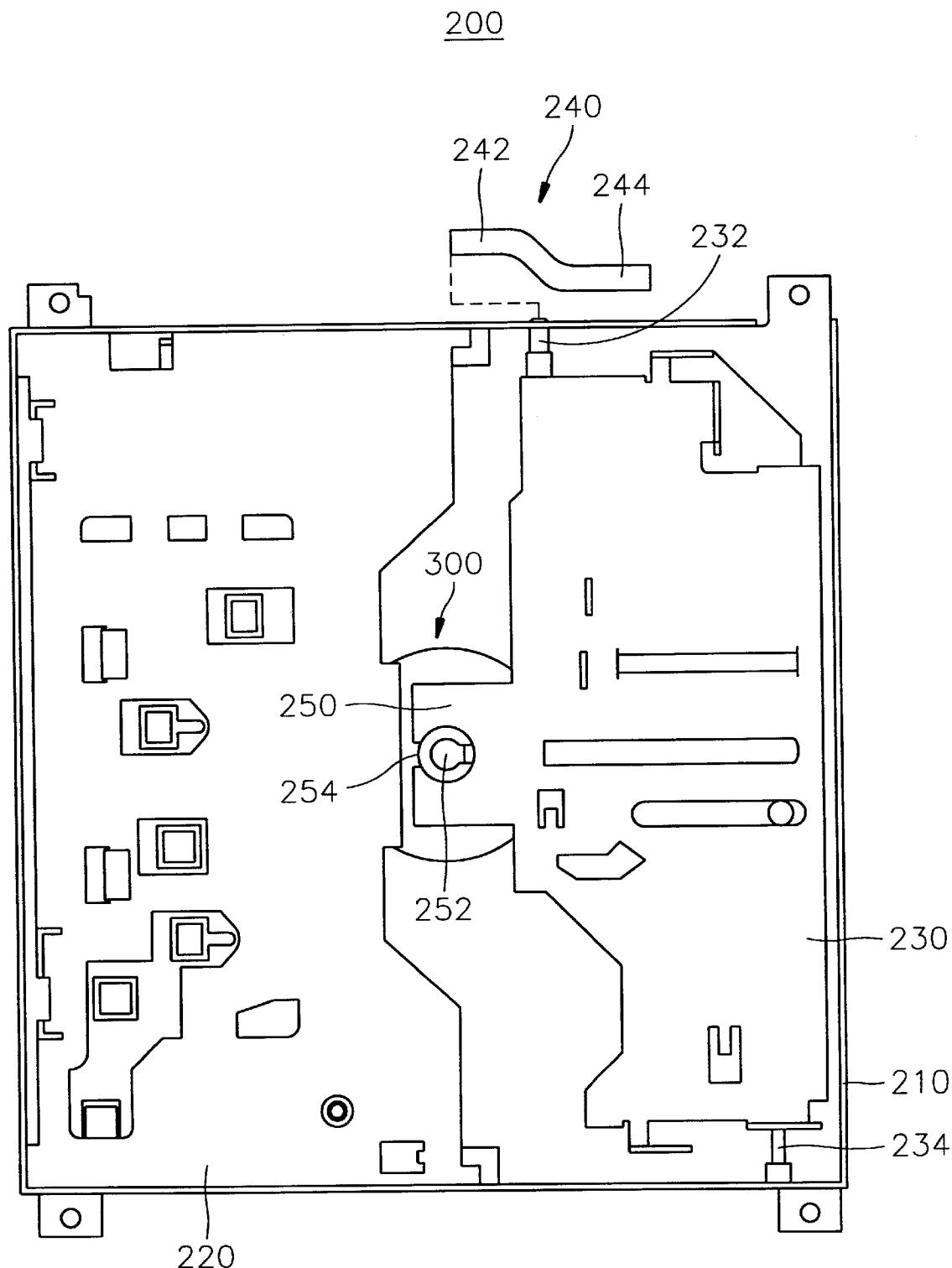
FIG. 1 is a plan view showing a conventional compact disc player for a vehicle.
Figure 2:
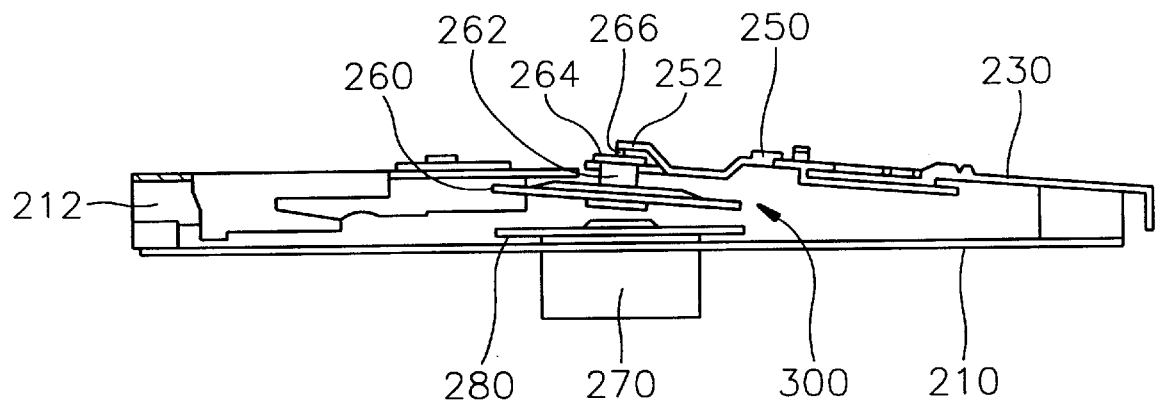
FIG. 2 is a partially sectional view of the conventional compact disc player shown in FIG. 1.
Figure 3:
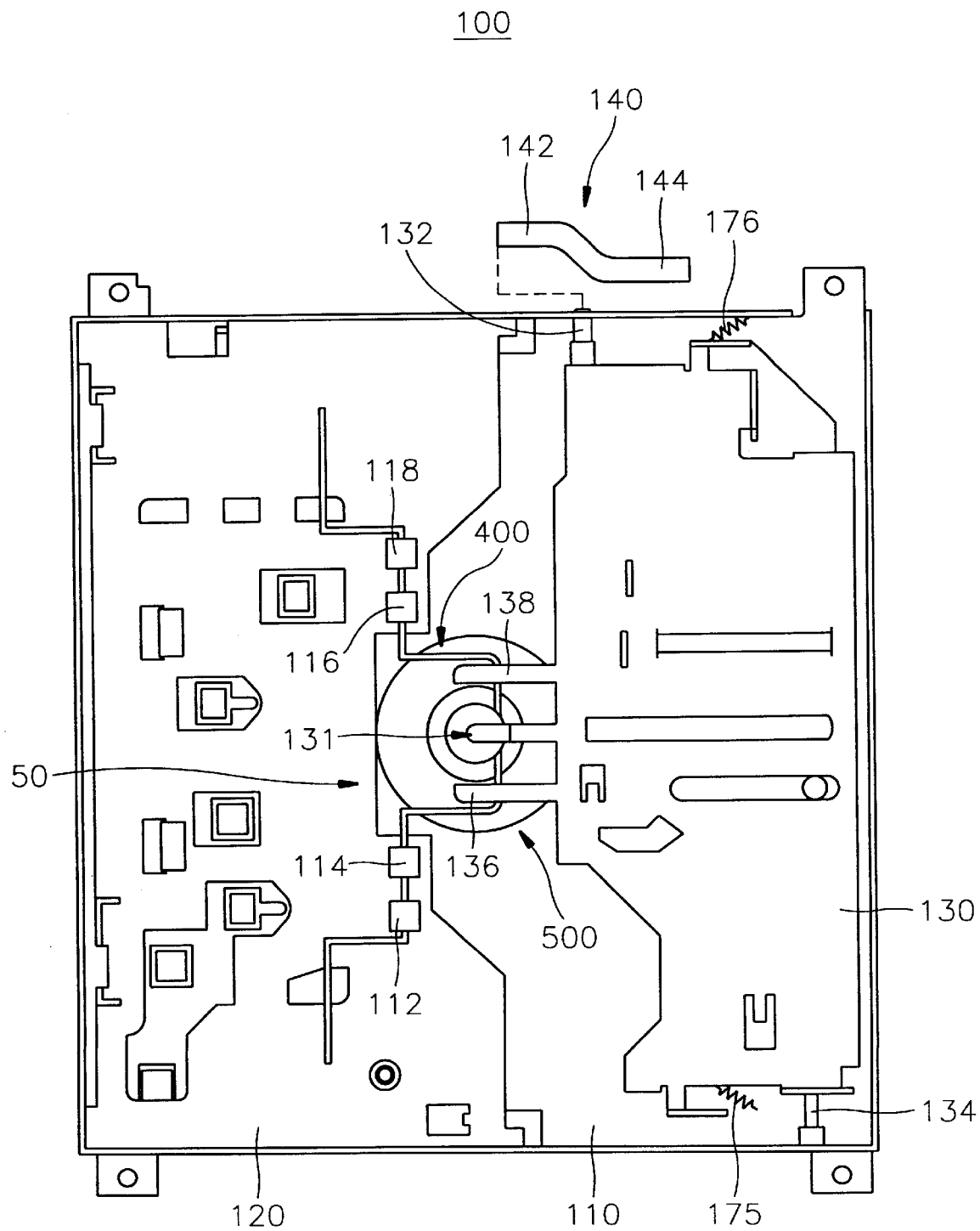
FIG. 3 is a plan view showing a compact disc player for a vehicle having a clamping apparatus according to one embodiment of the present invention.
Figure 4:
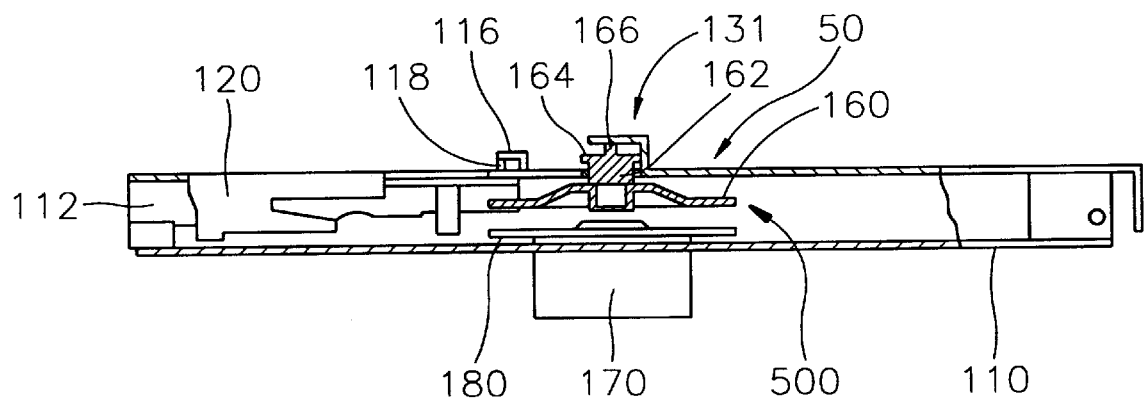
FIG. 4 is a partially sectional view of a compact disc player for a vehicle having a clamping apparatus according to one embodiment of the present invention.
Figure 5:
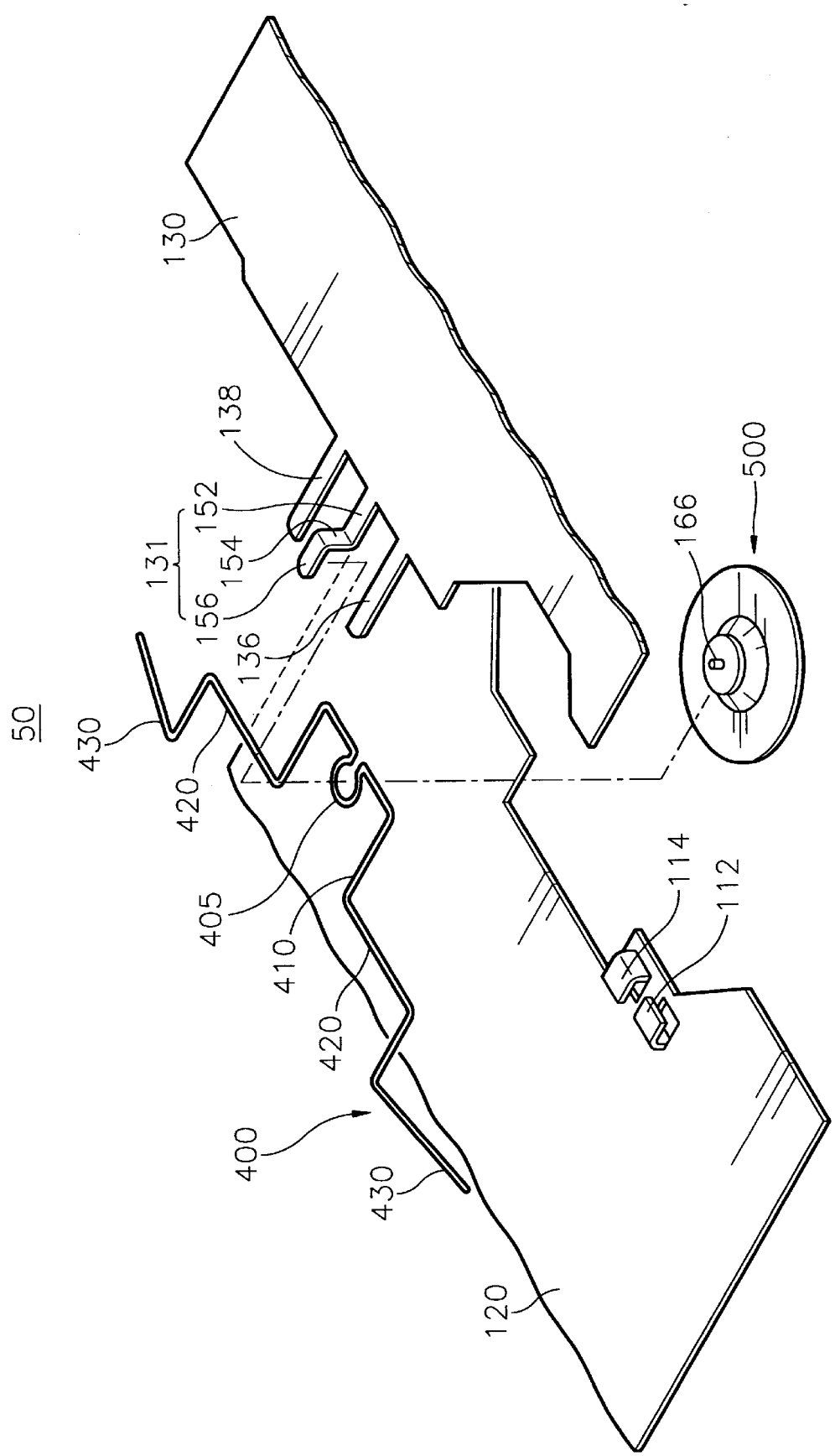
FIG. 5 is an exploded perspective view showing elements of a clamping apparatus according to the present invention.

FIGS. 3 and 4 show a disc player 100 for a vehicle having a clamping apparatus 50 according to the present invention. FIG. 3 is a plan view of disc player 100, FIG. 4 is a side sectional view of disc player 100, and FIG. 5 is an exploded perspective view showing elements of clamping apparatus 50.

As shown in FIGS. 3 and 4, disc player 100 includes a base 110. A disc insertion hole 112 through which a disc (not shown) is inserted and ejected is provided on one side of base 110. On an upper front side of base 110 which is adjacent to disc insertion hole 112, there is fixedly provided a first cover plate 120 which covers about half the upper surface of base 110. A second cover plate 130 is hinged to the upper rear side of base 110.

In addition, a spindle motor 170 for driving a turntable 180 is provided at the center of the underside of base 110. Second cover plate 130 is downwardly urged by a pair of springs 175 and 176 provided at the rear side of base 110.

A hinge shaft 134 is provided at the rear of a first side of second cover plate 130, and second cover plate 130 is hinged to base 110 by hinge shaft 134. A guide shaft 132 is provided at the front of a second side of a second cover plate 130. The second side of second cover plate 130 is opposite to the first side thereof. Guide shaft 132 is supported on a movable plate 140 provided on one side of base 110. Movable plate 140 is moved in the front and rear directions of base 110 by a separate gear mechanism (not shown). Guide shaft 132 is selectively supported on upper or lower portion 142 or 144 of movable plate 140 when movable plate 140 is moved in the front and rear directions of base 110, so the front portion of second plate 130 is upwardly or downwardly moved.

Clamping apparatus 50 comprises a plurality of fixing jaws 112, 114, 116 and 118 formed on the upper surface of first cover plate 120 and a multi-stepped elastic wire 400 which is engaged with fixing jaws 112, 114, 116 and 118. Multi-stepped elastic wire 400 upwardly urges a clamp 500 and horizontally maintains clamp 500 above turntable 180.

Referring to FIG. 5, multi-stepped elastic wire 400 has a supporting section 420 fixedly supported on the upper surface of first cover plate 120, a clamp suspending section 410 integrally formed with an upper end of supporting section 420, and a tilting section 430 integrally formed with a lower end of supporting section 420. Clamp suspending section 410 horizontally extends to turntable 180 by a predetermined length for suspending clamp 500 above turntable 180. Tilting section 430 is downwardly inclined with respect to supporting section 420 by a predetermined angle.

Clamp suspending section 410 has an annular concave portion 405 which is engaged with clamp 500. Since tilting section 430 is downwardly inclined with respect to supporting section 420, when multi-stepped elastic wire 400 has been installed on the upper surface of first cover plate 120, clamp suspending section 410 is upwardly urged a predetermined distance. Accordingly, when disc player 100 is in a stop mode, that is, when the disc has been ejected from disc play 100, clamp suspending section 410 stably supports the upper portion of clamp 500 thereby preventing clamp 500 from colliding with the underside of first cover plate 120 while a user is driving a vehicle.

Referring to FIG. 4, clamp 500 includes an annular plate 160 which makes contact with an upper surface of the disc, a neck portion 162 integrally formed with a center of an upper surface of annular plate 160, a cap portion 164 integrally formed on an upper surface of neck portion 162 and having a diameter larger than a diameter of neck portion 162, and a protuberance 166 integrally formed at a center of an upper surface of cap portion 164.

Neck portion 162 of clamp 500 is engaged with concave portion 405 of clamp suspending section 410. In order to stably support clamp 500 by clamp suspending section 410, concave portion 405 is formed at a predetermined position thereof with a slot which has a width smaller than the diameter of neck portion 162. In this case, neck portion 162 is press-fitted into concave portion 405 of clamp suspending section 410 through the slot.

In addition, a pair of extension bars 136 and 138 are integrally formed with the front portion of second cover plate 130. Extension bars 136 and 138 extend toward first cover plate 120 so as to make contact with an upper portion of clamp suspending section 410.

Extension bars 136 and 138 transfer a biasing force of springs 175 and 176 to the upper portion of clamp suspending portion 410, thereby downwardly biasing clamp suspending section 410. At this time, the downward biasing force of springs 175 and 176 should be larger than the upward biasing force of clamp suspending section 410.

On the other hand, a serpentine bar 131 is provided between the pair of extension bars 136 and 138. Serpentine bar 131 extends toward first cover plate 120 so as to make contact with an upper portion of protuberance 166 of clamp 500.

As is shown in FIG. 5 in detail, serpentine bar 131 includes a first horizontal portion 152 having a first end integrally formed with second cover plate 130 and having a horizontal position identical to the pair of extension bars 136 and 138, a vertical portion 154 integrally formed with a second end of horizontal portion 152, and a second horizontal portion 156 integrally formed with an upper end of vertical portion 154. Second horizontal portion 152 extends beyond protuberance 166 of clamp 500 so that the underside of second horizontal portion 152 makes contact with the upper portion of protuberance 166.

Hereinafter, the operation of disc player 100 having clamping apparatus according to the present invention will be explained.

Firstly, when disc player 100 is in a stop mode, that is, when the disc has been ejected from disc play 100, guide shaft 132 is supported on upper end portion 142 of movable plate 140, so the front portion of second cover plate 130 maintains an upwardly moved position as shown in FIG. 4.

At this time, since clamp 500 is supported by multi-stepped elastic wire 400 in such a manner that the clamp 500 is upwardly urged, clamp 500 does not make contact with first cover plate 120 while a user is driving the vehicle, so a noise called "rattle noise" caused by the collision between first cover plate 120 and clamp 500 does not occur.

In this state, the disc is inserted into disc insertion hole 112 by a user. Then, the disc is guided into the interior of disc player 100 and positioned on turntable 180 by a disc loading mechanism (not shown) such as a gear mechanism or the like. At this time, since clamp 500 is horizontally maintained above turntable 180, the disc being loaded onto turntable 180 does not collide with clamp 500.

Then, movable plate 140 is moved to the front of base 110 by a separate gear mechanism. As movable plate 140 is moved to the front of base 110, guide shaft 132 supported on upper portion 142 of movable plate 140 is supported on lower portion 144 of movable plate 140, and the front portion of second cover plate 130 is moved downward by means of the biasing force of springs 175 and 176.

At this time, clamp suspending section 410 of elastic wire 400 is downwardly forced by the pair of extension bars 136 and 138 which are integrally formed with the front portion of second cover plate 130 so as to make contact with the upper portion of elastic wire 400. At this time, clamp 500 engaged with clamp suspending section 410 is moved downwardly while maintaining its horizontal state. As a result, annular plate 160 of clamp 500 makes contact with the upper surface of the disc loaded on turntable 180.

On the other hand, serpentine bar 131 disposed between the pair of extension bars 136 and 138 slightly makes contact with the upper surface of protuberance 166 when the disc has been loaded on turntable 180 so that annular plate 160 of clamp 500 can stably make contact with the disc loaded on turntable 180.

In this state, a play mode is carried out, and since the disc is stably clamped by clamping apparatus 50, the disc player can excellently reproduces information recorded on the disc.

As described above, the clamping apparatus according to the present invention does not make contact with the disc while the disc is being inserted/ejected into/from the disc player, so damage to the disc or to the clamp can be prevented.

In addition, since the clamp is horizontally maintained above the turntable by the elastic wire, the clamp does not fluctuate while a user is driving the vehicle, so the clamp is prevented from colliding with the first cover plate, thereby reducing the noise.

Furthermore, since the clamp is easily assembled to the elastic wire, manufacturing the clamp is easy.

Although the preferred embodiment of the invention has been described, it will be understood by those skilled in the art that the present invention should not be limited to the described preferred embodiment, but various changes and modifications can be made within the spirit and scope of the invention as defined by the appended claims.

What is claimed is:

1. A disc clamping apparatus for a disc player having a base, a first cover plate attached to an upper front portion of the base, a second cover plate hinged to an upper rear portion of the base, and a turntable disposed at a center of the base, the disc clamping apparatus comprising:

a clamp for clamping the disc loaded on the turntable;

a first means for upwardly lifting the clamp by a first biasing force, the first means horizontally maintaining the clamp above the turntable, the first means including a multi-stepped elastic wire having a supporting section fixedly supported on the upper surface of the first cover plate, a clamp suspending section integrally formed with an upper end of the supporting section, and a tilting section integrally formed with a lower end of the supporting section, the clamp suspending section horizontally extending to the turntable by a predetermined length for suspending the clamp above the turntable, the tilting section being downwardly inclined with respect to the supporting section by a predetermined angle;

a second means for downwardly forcing the first means by a second biasing force so that the clamp is rested on an upper surface of the turntable; and a third means for allowing the clamp to stably rotate, the third means making contact with a center portion of an upper surface of the clamp.

2. The disc clamping apparatus as claimed in claim 1, wherein the second biasing force is greater than the first biasing force.

3. The disc clamping apparatus as claimed in claim 1, further comprising a fourth means for securing the first means to an upper surface of the first cover plate.

4. The disc clamping apparatus as claimed in claim 3, wherein the fourth means includes a plurality of fixing jaws formed on the upper surface of the first cover plate, the supporting section of the elastic wire being securely coupled to the fixing jaws.

5. The disc clamping apparatus as claimed in claim 3, wherein the clamp includes an annular plate which makes contact with an upper surface of the disc, a neck portion integrally formed with a center of an upper surface of the annular plate, a cap portion integrally formed on an upper surface of the neck portion and having a diameter larger than a diameter of the neck portion, and a protuberance integrally formed at a center of an upper surface of the cap portion.

6. The disc clamping apparatus as claimed in claim 5, wherein the clamp suspending section has an annular concave portion into which the neck portion of the clamp is inserted.

7. The disc clamping apparatus as claimed in claim 6, wherein the neck portion has a diameter smaller than a diameter of the annular concave portion.

8. The disc clamping apparatus as claimed in claim 6, wherein the second means includes a pair of springs which are provided at both sides of the second cover plate for downwardly biasing the second cover plate, and a pair of extension bars which are integrally formed with a front portion of the second cover plate, the extension bars extending toward the first cover plate so as to make contact with an upper portion of the clamp suspending section.

9. The disc clamping apparatus as claimed in claim 8, wherein the third means includes a serpentine bar provided between the pair of extension bars, the serpentine bar extending toward the first cover plate so as to make contact with an upper portion of the protuberance.

10. The disc clamping apparatus as claimed in claim 9, wherein the serpentine bar includes a first horizontal portion having a first end integrally formed with the second cover plate and having a horizontal position identical to the pair of extension bars, a vertical portion integrally formed with a second end of the horizontal portion, and a second horizontal portion integrally formed with an upper end of the vertical portion, the second horizontal portion extending beyond the protuberance so that an underside of the second horizontal portion makes contact with the upper portion of the protuberance.

* * * * *